United States Patent [19]

Masumoto et al.

[11] Patent Number: 5,410,574
[45] Date of Patent: Apr. 25, 1995

[54] INTERNAL COMPONENT OF FUSION REACTOR

[75] Inventors: Hiroshi Masumoto, Yokohama; Tsutomu Honda, Tokyo; Nobuo Tachikawa, Ibaraki; Iwao Ohshima, Kawasaki; Takashi Ishitori, Yokohama; Nobuhiko Tanaka, Yokohama; Masaru Nakai, Yokohama, all of Japan

[73] Assignee: Kabushiki Kaisha Toshiba, Kawasaki, Japan

[21] Appl. No.: 174,520

[22] Filed: Dec. 28, 1993

[30] Foreign Application Priority Data

Dec. 28, 1992 [JP] Japan .................................. 4-349064

[51] Int. Cl.⁶ .............................................. G21B 1/00
[52] U.S. Cl. .................................... 376/150; 376/146
[58] Field of Search .......................... 376/150, 146, 143

[56] References Cited

U.S. PATENT DOCUMENTS

| H,598 | 3/1989 | Creedon et al. | 376/150 |
| 3,802,456 | 4/1974 | Wittgenstein | 138/104 |
| 4,555,275 | 11/1985 | Tobin | 376/136 |
| 4,626,400 | 12/1986 | Jassby et al. | 376/150 |
| 4,698,198 | 10/1987 | Gruen | 376/150 |
| 4,767,592 | 8/1988 | Phelps et al. | 376/150 |

FOREIGN PATENT DOCUMENTS

| 2116330 | 10/1971 | Germany. | |
| 61-4993 | 1/1986 | Japan | 376/150 |
| 3-218497 | 9/1991 | Japan | 376/150 |

OTHER PUBLICATIONS

International Atomic Energy Agency, Vienna, 1991, pp. 47–88, Iter Documentation Series, No. 29, D. Smith, et al., "Iter Blanket, Shield and Material Data Base".
Miller, J. Vac. Sci. Technol., 20(4), Apr. 1982, pp. 1168–1169, 1171–1172.
Minato et al, Journal of Fusion Energy, vol. 5, No. 3, Sep. 1986, pp. 201–212.
Proceedings of the Fourteenth IEEE/WPSS Symposium on Fusion Engineering, Sep. 30–Oct. 3, 1991, San Diego, Calif., vol. 1, pp. 350–356, J. Schlosser, et al., "Development of High Thermal Flux Components for Continuous Operation in Tokamaks".
Proceedigns of the Eleventh Symposium on Fusion Engineering, Nov. 18–22, 1985, Austin, Tex., vol. 2, pp.1174–1177, T. E. McKelvey, "DIII–D Vacuum Vessel Protection System".
Journal of Vacuum Science & Technology, vol. 20, 1982, pp. 1182–1187, G. L. Jackson, "The Leak Testing Program of the Double III Project".
Fusion Engineering and Design, vol. 21, Feb. 1993, pp. 245–274, "The Net Device–Plasma–Facing Components".

Primary Examiner—Daniel D. Wasil
Attorney, Agent, or Firm—Oblon, Spivak, McClelland, Maier & Neustadt

[57] ABSTRACT

A fusion reactor has an internal component in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly. The internal component includes a cooling structure of a multi-wall structure having multiple walls formed to the internal structure assembly and a flow channel formed in the cooling structure for a cooling fluid for extracting heat caused by plasma and a nuclear reaction. The internal structure assembly includes a plurality of outboard blanket assemblies each having a surface facing the plasma, a plurality of inboard blanket assemblies each having a surface facing the plasma and a plurality of divertor assemblies each having a surface facing the plasma, the outboard blanket assemblies and the inboard blanket assemblies and the divertor assemblies being arranged along the circumferential direction of the toric vacuum vessel and each of these assemblies being provided with the cooling structure formed on the surface thereof facing the plasma. The internal component also includes means for detecting leakage of gas.

36 Claims, 14 Drawing Sheets

INTERNAL COMPONENT OF FUSION REACTOR

FIELD OF THE INVENTION

1. Background of the Invention

This invention relates to an internal component or structure of a fusion reactor and, more particularly, to an internal component or structure of a fusion reactor having a cooling structure for removing heat caused by a thermal load from a plasma or nuclear reaction.

2. Discussion of the Background

These days, many countries including Japan are energetic in making research and development of nuclear fusion reactors which are expected to one of a number of promising future energy sources. In fact, large-scale plasma testing apparatus have been built to enable the establishment of prospects of various physical properties, such as plasma physics, impurity control, plasma heating, fuel injection and tritium breeding, in nuclear fusion reactors including tokamak reactor which is considered as being the representative of nuclear fusion reactors.

Current designs of nuclear fusion reactors have encountered difficulties in protecting from heat the internal reactor components for confining plasma within the reactor. More specifically, internal components of a nuclear fusion reactor includes tritium non-breeding inboard blankets and tritium breeding outboard blankets which are densely arranged in the circumferential direction within a torus-type vacuum vessel, as well as divertors which are arranged densely in upper and/or lower spaces inside the vacuum vessel for the purpose of discharging He which is a plasma reaction product, thus forming a reactor internal structure. The arrangement is such that the plasma generated in the torus internal space defined by the above-mentioned reactor internal structure is confined by a toroidal field coil or a poloidal field coil.

The reactor internal components of a nuclear fusion reactor has a cooling structure for removing heat which has been transferred to the reactor internal structure from the plasma, by means of a coolant such as water introduced into the cooling structure.

The cooling structure, which is disposed comparatively close to the plasma, tends to receive thermal and particle loads from the plasma. In addition, the cooling structure is also placed under action of many tritium rays radiated from the plasma, because the current design of nuclear fusion reactor relies upon deutrium-tritium reaction known as D−T reaction [D+T→$^4$He(3.5 MeV)+n(14.1 MeV)]. Tritium, which is radioactive, requires greatest care in handling.

In the reactor inner structure of a nuclear fusion reactor, tritium which does not substantially exist naturally is generated by the action of neutrons derived from the plasma, while nuclear reaction heat generated during generation of tritium is carried away through the cooling structure in the blankets. Therefore, the cooling structure in the reactor inner structure is subjected to nuclear reaction heat and tritium. Thus, the cooling structure must be operated in such an environment which supplies much heat, particles and tritium to the cooling structure.

The cooling structure therefore is constructed typically as illustrated in FIG. 16. More specifically, the cooling structure 1 has an internal cooling water passage 2 for allowing cooling water as the coolant to circulate therethrough. Such cooling structure is adapted for the inboard and outboard blankets and divertors disposed in the reactor internal component or structure.

The cooling structure for cooling the reactor internal component tends to exhibit minute cracking and damage due to the aforementioned thermal and particle loads and due to other causes such as application of electromagnetic forces produced during operation of the nuclear fusion reactor. Such minute cracks or damage of the cooling structure tends to allow leakage of the coolant. The leakage of the coolant, when occurred inside the vacuum vessel, undesirably lowers the level of the vacuum inside the vessel, seriously affecting the operation of the nuclear fusion reactor.

The outboard blankets as a part of the reactor internal structure contains lithium oxide for the purpose of breeding tritium. In addition, a high temperature, e.g., several hundreds of degrees centigrade is established inside the blanket during operation of the nuclear fusion reactor. A risk therefore exists that the coolant leaking from the cooling structure contacts the lithium oxide so as to cause a chemical reaction, as well as rapid evaporation of the coolant, thus impeding the functions of the components inside the reactor.

Furthermore, the cracks and damage, even though they may be small at the beginning, can grow so as to lead to a critical accident or problems such as rupture of the cooling structure and loss of the coolant, if a suitable measure such as repair is not taken.

The tritium radiated from the plasma permeates through the material of the cooling structure so as to be diffused to reach the coolant, thus contaminating the coolant.

Furthermore, operation of a nuclear fusion reactor often experiences an abnormal state such as disruption in which plasma is suddenly extinguished. In the event of such an abnormality, a huge electromagnetic force is generated, tending to destroy or damage the cooling system.

SUMMARY OF THE INVENTION

In view of the above-described circumstances, an object of the present invention is to substantially eliminate defects or drawbacks encountered in the prior art and to provide an internal component or structure of a fusion reactor which is improved in terms of safety by multiple protection against thermal/particle loads received from a plasma and other places by a cooling structure.

Another object of the present invention is to provide an internal component or structure of a fusion reactor in which a leakage of a coolant due to small cracking and damage in a cooling structure can be immediately detected and tritium contamination of the coolant can be limited.

These and other objects can be achieved according to the present invention by providing an internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly, the internal component comprising:

a cooling structure of a multi-wall structure having walls formed in the internal structure assembly; and a flow channel formed in said cooling structure for a cooling fluid for extracting heat caused by plasma and a nuclear reaction.

In a preferred embodiment, the internal structure assembly comprises a plurality of outboard blanket assemblies each having a surface facing the plasma, a plurality of inboard blanket assemblies each having a surface facing the plasma and a plurality of divertor assemblies each having a surface facing the plasma, the outboard blanket assemblies and the inboard blanket assemblies and the divertor assemblies being arranged along the circumferential direction of the toric vacuum vessel and each of the outboard blanket assemblies and the inboard blanket assemblies and the divertor assemblies is provided with the cooling structure formed on the surface thereof facing the plasma.

In detailed embodiments, the cooling structure is formed of an inner wall member in which a flow channel for the cooling fluid is formed and an outer wall member surrounding the inner wall member with a gap formed therebetween. A leak detection mechanism is provided so as to communicate with the gap for detecting a leak of the cooling fluid into the gap between the inner and outer wall members.

A gap is formed between the walls and a hydrogen processor capable of communicating with the gap is provided to separate and store hydrogen and hydrogen isotopes entering the cooling structure. The hydrogen processor is provided for a gas circulation system in which a gas, i.e. inert gas such as helium, circulates, an internal space of the hydrogen processor is partitioned into a processed gas chamber forming a part of the gas circulation system and a processing chamber for storing hydrogen and hydrogen isotopes by a hydrogen permeable membrane permeable to hydrogen and hydrogen isotopes. The hydrogen processor is arranged to oxidize at least one of hydrogen and hydrogen isotopes separated by the hydrogen permeable membrane. A hydrogen getter is accommodated in the processing chamber of the hydrogen processor and separated hydrogen and hydrogen isotopes are absorbed and stored by the hydrogen getter.

A gap is formed between the multiple walls and gas and liquid circulation systems are communicated with the gap, the circulation systems including means for measuring a change of a state of a pressure, a water content and a temperature in a gas and a liquid existing in the gap to detect a leak of the gas and a cooling liquid flowing through the cooling structure. A gap is formed between the multiple walls of the cooling structure and a pressure detection mechanism capable of communicating with the gap is provided to detect a leak out of the cooling structure of a gas existing in the gap.

A detector for detecting a gas is provided at an exhaust port communicating with the internal space of the toric vacuum vessel to detect a leak of the gas out of the cooling structure through an internal space of the vacuum vessel.

A plurality of exhaust ports communicating with the internal space of the toric vacuum vessel are arranged in a circumferential direction of the vacuum vessel and detectors for detecting a gas are respectively provided at the exhaust ports to detect a place through which the gas leaks out of the cooling structure.

A gap is formed between the walls of the cooling structure and metallic wires having a high heat conductivity are provided in the gap. The metallic wires are formed of a same material as that of the cooling structure or formed of a material having a heat conductivity higher than that of a material forming the cooling structure.

The walls of the cooling structure are closely fitted to each other with partial gaps formed between the walls as grooves through which a fluid is caused to flow.

The cooling structure has a thickness which is reduced at a side facing the high-temperature plasma.

The cooling structure has a rectangular shape in cross section or may have a circular shape in cross section composed of inner and outer pipe members.

The cooling structure is integrally formed with the surface, facing the plasma, of each of the outboard blanket assemblies, inboard blanket assemblies and divertor assemblies. The cooling structure may be separately formed from the surface, facing the plasma, of each of the outboard blanket assemblies, inboard blanket assemblies and divertor assemblies and the cooling structure is then secured to the surface thereof.

According to the characters and structures of the present invention described above, in the internal components or structures of the fusion reactor in accordance with the present invention, the cooling fluid channels are formed in the cooling structures, thereby achieving multiple protection against thermal and particle loads received from the plasma by the cooling structures. To improve heat conduction between the walls in the cooling structures, the walls are closely fitted to each other or metallic wires are provided in the gaps formed between the walls, and the thickness of the walls is changed for further improvement in heat conduction, thereby achieving multiple protection without impairing the internal component cooling function. In the cooling structures, flow grooves through which a fluid flows are formed as partial gaps between closely-fitted surfaces of the walls, and a function of detecting a leak of the coolant through the flow grooves or gaps between the walls is provided, thereby making it possible to detect even a small coolant leak due to cracking or damage in the cooling structures. It is therefore possible to prevent rupture or damage in the cooling structures with the advancement of damage or cracking in the internal structure of the fusion reactor or a loss-of-coolant accident due to rupture or damage in the cooling structures.

If the kind and the mixture ratio of fluids flowing through the gaps formed between the multiple walls of the cooling structures or through flow grooves formed as partial gaps are suitably selected, a place in the cooling structures where cracking or damage occurs can be ascertained. It is thereby possible to rapidly take measures for repair and maintenance of the internal components or structures of the fusion reactor. The reliability of the fusion reactor is thereby improved.

Further, a function of disposing of tritium passing through the cooling structures through the gaps formed between the walls of the cooling structures or through flow grooves forming partial gaps is provided, and a hydrogen storage alloy is used to form a part or the entire of the material of the multiple walls. The amount of the tritium passing and diffusing through the cooling structures and entering the coolant can thereby be reduced effectively, thus limiting tritium contamination of the coolant.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

The natures and further features of the present invention will be made more clear from the following descriptions with reference to the accompanying drawings.

DESCRIPTION OF THE PREFERRED EMBODIMENTS

The internal components or structure of a fusion reactor in accordance with one embodiment of the present invention will be described below with reference to the accompanying drawings.

Figure 1:
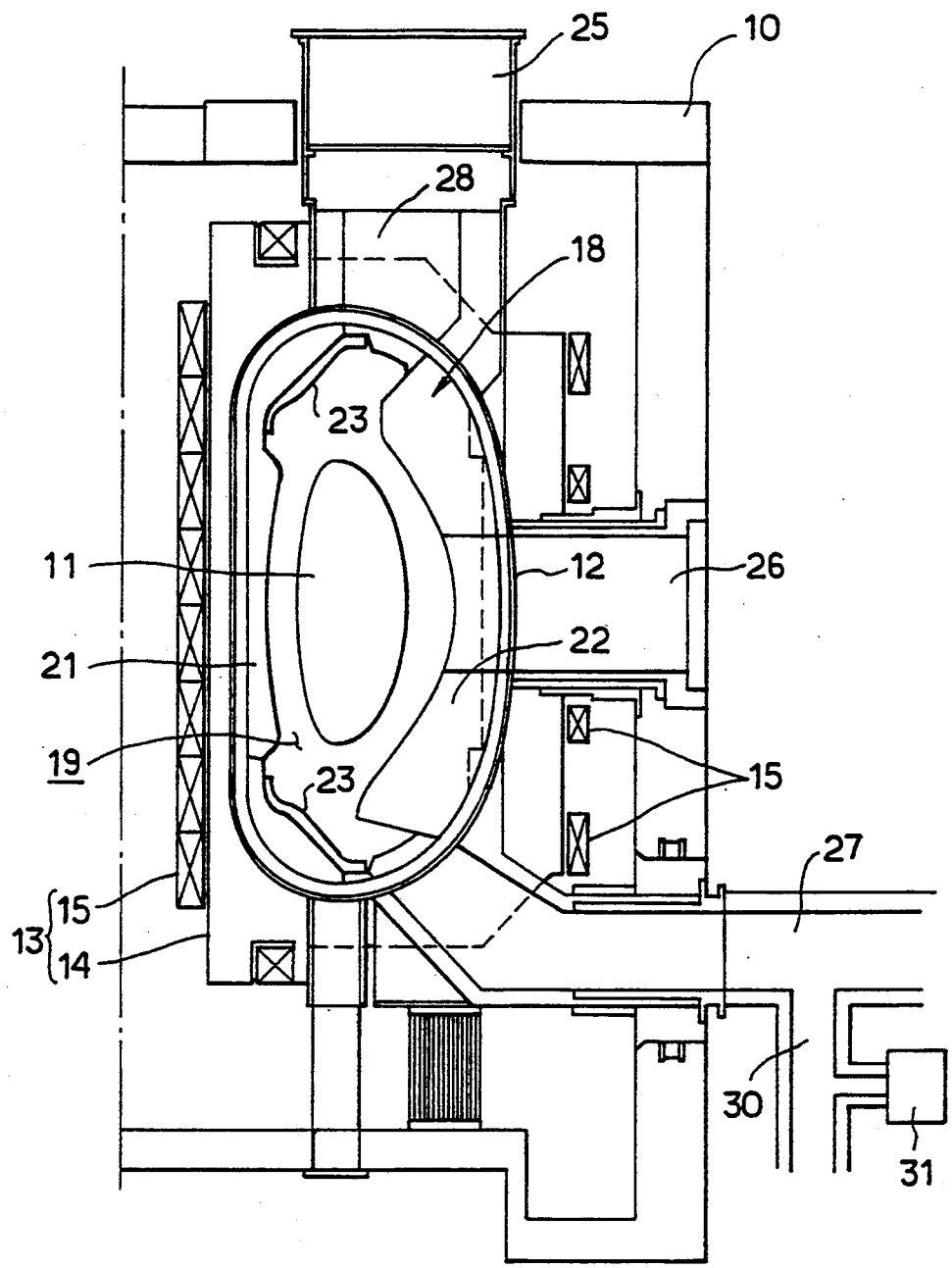
FIG. 1 is a schematic longitudinal sectional view of a right half of a fusion reactor having an internal component or structure provided with an improved cooling structure according to the present invention.

FIG. 1 is a schematic sectional view of a right half of a tokamak fusion reactor to which the present invention is applied. This fusion reactor has an adiabatic torus-type vacuum vessel, i.e. a toric vacuum vessel 12, for confining high-temperature plasma 11. The vacuum vessel 12 is accommodated in a cryostat 10 having a height of, for example, about 30 m. The vacuum vessel 12 has a height of, for example, 20 m, and a plurality of coils 13 for generating magnetic lines of force surrounding the plasma 11 are provided around the vacuum vessel 12. The coils 13 include a toroidal field coil 14 for generating magnetic lines of force in an axial direction (a toroidal magnetic field), an air-core current transformer coil, not shown, for generating a plasma current, a poloidal field coil 15 for applying a poloidal magnetic field in a clockwise direction with respect to the direction of the plasma current, and position/shape control coils for controlling the position and cross-sectional shape of the plasma 11.

An internal structure assembly 18 is provided in the vacuum vessel 12. A toric internal space 19 in which generated plasma 11 is confined is formed inside the internal structure assembly 18. The internal structure assembly 18 is formed by segmental groups of components closely arranged in a circumferential direction in the vacuum vessel 12. The internal structure assembly 18 includes a plurality of non-tritium-breeding inboard blanket assemblies 21 arranged on the inner circumferential side of the vacuum vessel 12, a plurality of tritium-breeding outboard blanket assemblies 22 arranged on the outer circumferential side of the vacuum vessel 12 and divertors 23 arranged in a circumferential direction along upper and lower walls of the vacuum vessel 12. The divertors 23, each the shape of plate-like member, are constructed as an apparatus for discharging helium which is a reaction product from plasma 11.

The internal space 19 of the toric vacuum vessel 12 can be accessed through a group of upper ports 25 for inspecting, maintaining and interchanging the internal structure assembly 18, a group of horizontal ports 26 provided as connecting ports, and a group of lower ports 27 provided as maintenance ports. For example, as each of the groups of upper, horizontal and lower ports 25, 26 and 27, several ports are formed along a toric direction of the vacuum vessel 12. An opening of each upper port 25 is covered with a shielding plug 28. Each of the horizontal port 26 is connected to a plasma heater, not shown, and a plasma measuring device or the like.

An exhaust port 30 diverges from an intermediate portion of each lower port 27, and a helium detector 31 is provided as a gas detection means, i.e., a leak detector, at an intermediate portion of the exhaust port 30.

Helium detectors 31 are connected to exhaust ports 30 for evacuating the internal space 19 of the toric vacuum vessel 12. A plurality of exhaust ports 30 are provided in the fusion reactor, and a plurality of helium detectors 31 are provided in association with the exhaust ports 30. Ordinary helium leak detectors are used as the helium detectors 31.

Figure 2:
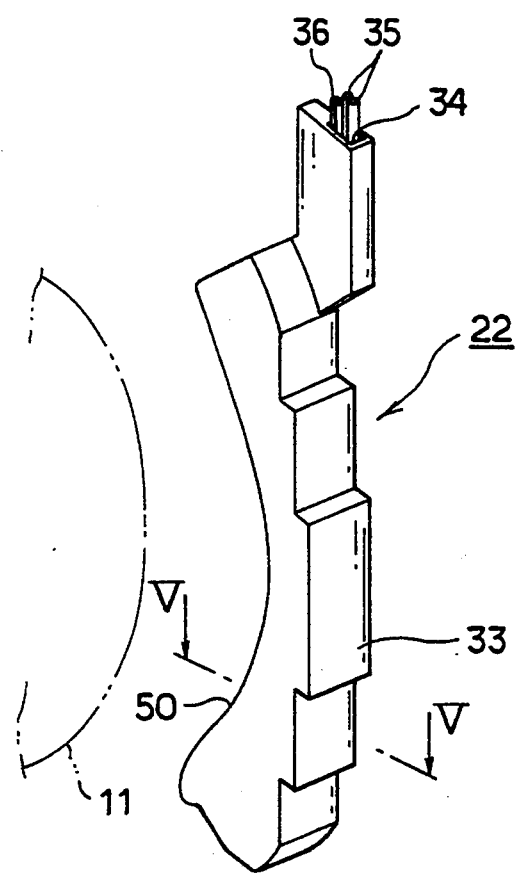
FIG. 2 is an illustration of the external appearance of a blanket segment of an outboard blanket assembly constituting the internal component of the fusion reactor.

About 30 segments of inboard blanket assembly 21 and outboard blanket assembly 22 are arranged in a circumferential direction in the toric vacuum vessel 12 of the fusion reactor. FIG. 2 illustrates an external configuration of a blanket segment 33 constituting one segment of the outboard blanket assembly 22. A piping outlet/inlet port 34 is formed in an upper portion, as viewed in FIG. 2, of the blanket segment 33. Piping 35 for circulation of a coolant, i.e., cooling water, and piping 36 for circulation of inert gas such as helium gas are connected to the blanket segment 33 through the outlet/inlet port 34.

Figure 3:
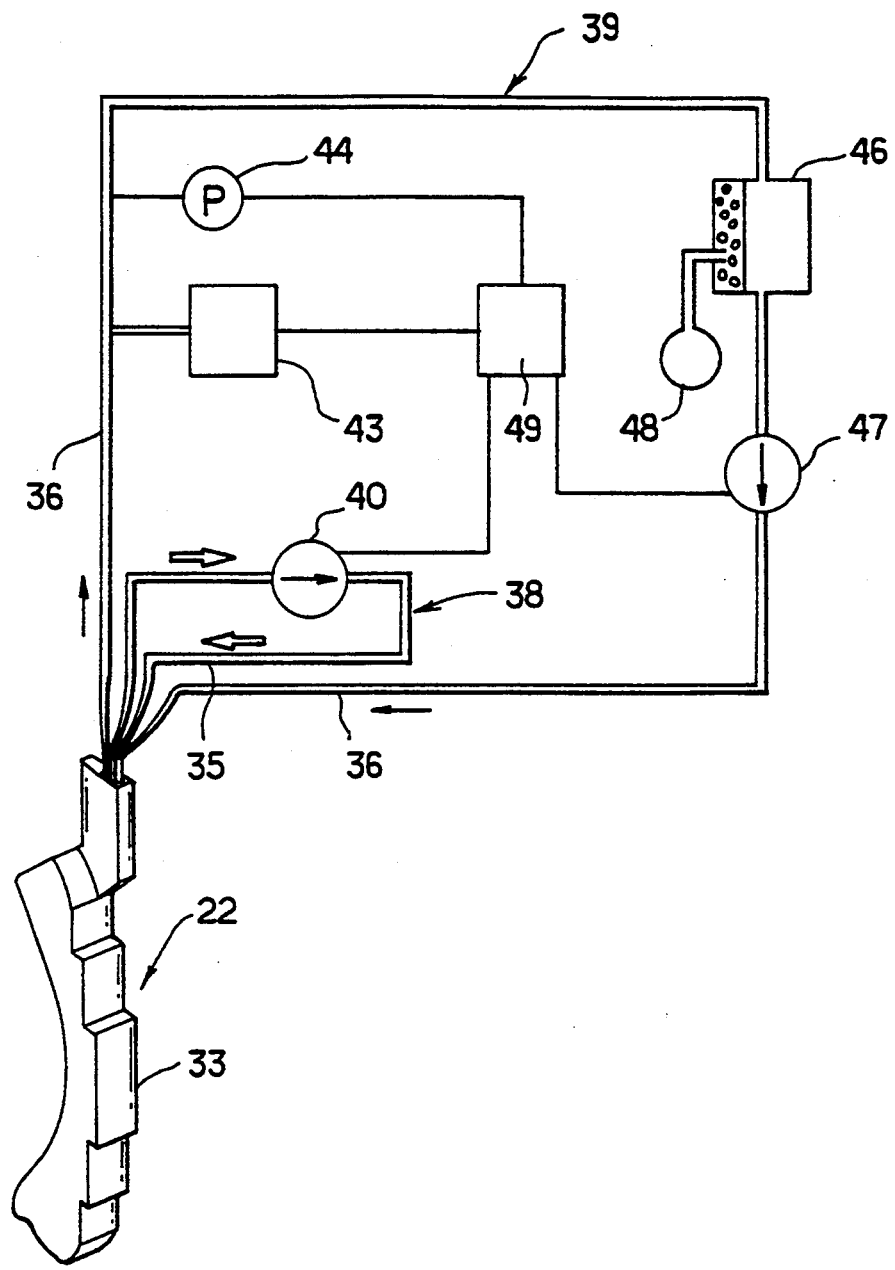
FIG. 3 is a diagram of the connection between each outboard blanket segment and circulation systems through which cooling water and an inert gas such as helium gas circulate.

As shown in FIG. 3, internal sections of each blanket segment 33 of the outboard blanket assembly 22 are connected to a cooling water circulation system 38 and an inert gas circulation system 39 through the cooling water circulation piping 35 and the gas circulation piping 36, respectively. The internal sections of each blanket segment 33 constitute portions of the cooling water circulation system 38 and the gas circulation system 39. A cooling water circulation pump 40 and a heat exchanger, not shown, of a steam generator are provided in the cooling water circulation system 38 to cool the cooling water.

In the gas circulation system 39, a water content measuring device 43 provided as a cooling water leak detection mechanism for detecting the water content in inert gas such as helium, a pressure detection mechanism, i.e., a pressure gauge 44 for detecting the pressure of the inert gas, a temperature detection mechanism, i.e., a thermometer, not shown, for detecting the temperature of the inert gas, a hydrogen processor 46 for separating and accumulating hydrogen and hydrogen isotopes, and a gas circulation pump 47 are successively connected to form a closed cycle. A vacuum pump 48 is connected to the hydrogen processor 46. The efficiency of separating hydrogen and hydrogen isotopes is improved by evacuation with the vacuum pump 48.

Signals representing the quantities detected by the water content measuring device 43, the pressure gauge 44 and the thermometer are sent to and processed by a controller 49. The controller 49 controls the operation of the cooling water circulation pump 40 and the gas circulation pump 47.

Figure 5A:
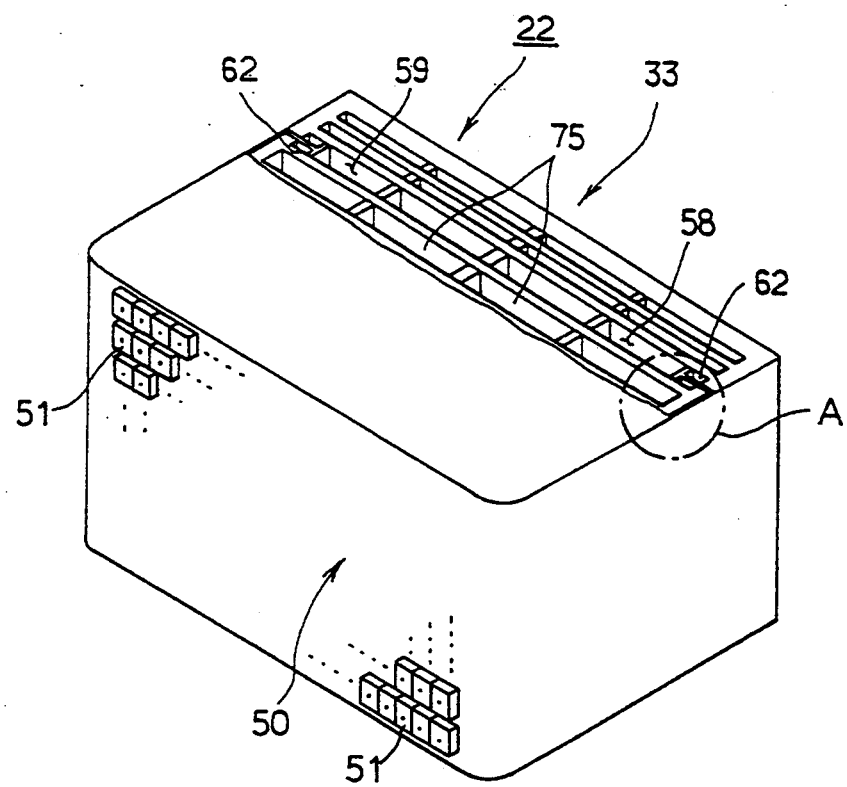
FIGS. 5A and 5B are perspective views, partially in section, showing a blanket segment taken along line V—V of the outer blanket unit.

Each blanket segment 33 of the outboard blanket assembly 22 has an internal structure such as that shown in FIG. 5A. A top plan view of the illustration shown in FIG. 5A corresponds to a sectional view of the blanket section 33 taken along the line V—V of FIG. 2.

Figure 5B:
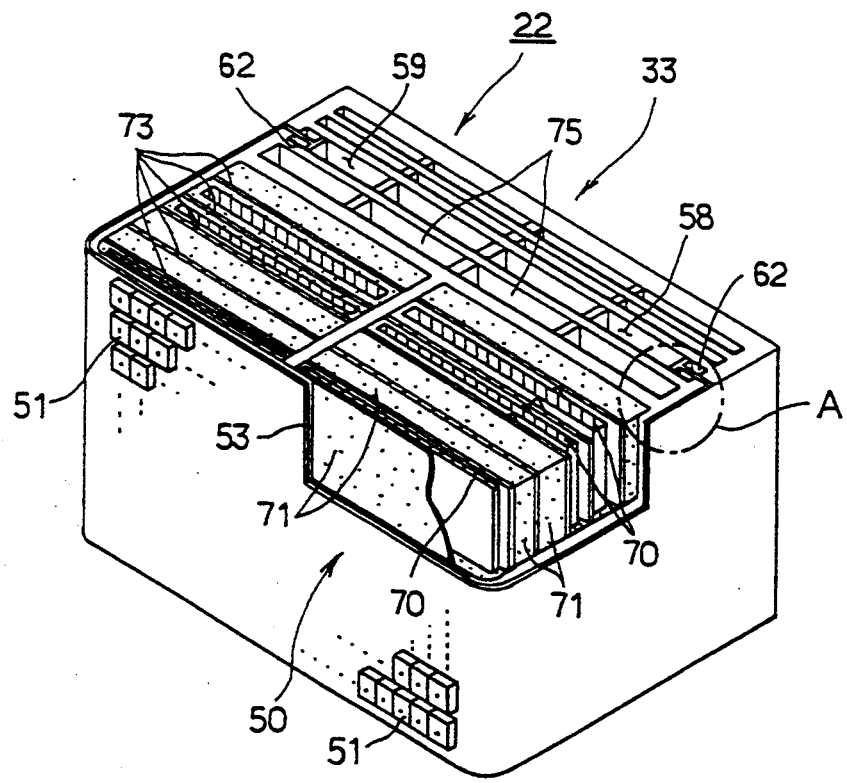

In each blanket segment 33, a first wall 50 is formed on the circumferential side of the blanket assembly 22 facing the plasma 11. Heat resistant members 51 called armor and formed of a high-melting-point material such as graphite are attached to a surface of the first wall 50 of the blanket segment 33 so that the heat of the plasma 11 is not directly applied thereto. The heat resistant members 51 are attached at least to the surface of the wall 50 facing the plasma side though only few of them are illustrated in FIGS. 5A or 5B.

The first wall 50 is provided for the purpose of maintaining the internal structure assembly 18 in a sound state by absorbing a thermal load or the like from the high-temperature plasma. The inboard blanket assembly 21 of the internal structure assembly 18 is also constructed for the same purpose. Since the thermal load received from high-temperature plasma 11 by the first wall 50 is large, a cooling structure 53 arranged to remove heat with cooling water is provided in the first wall 50.

Figure 6:
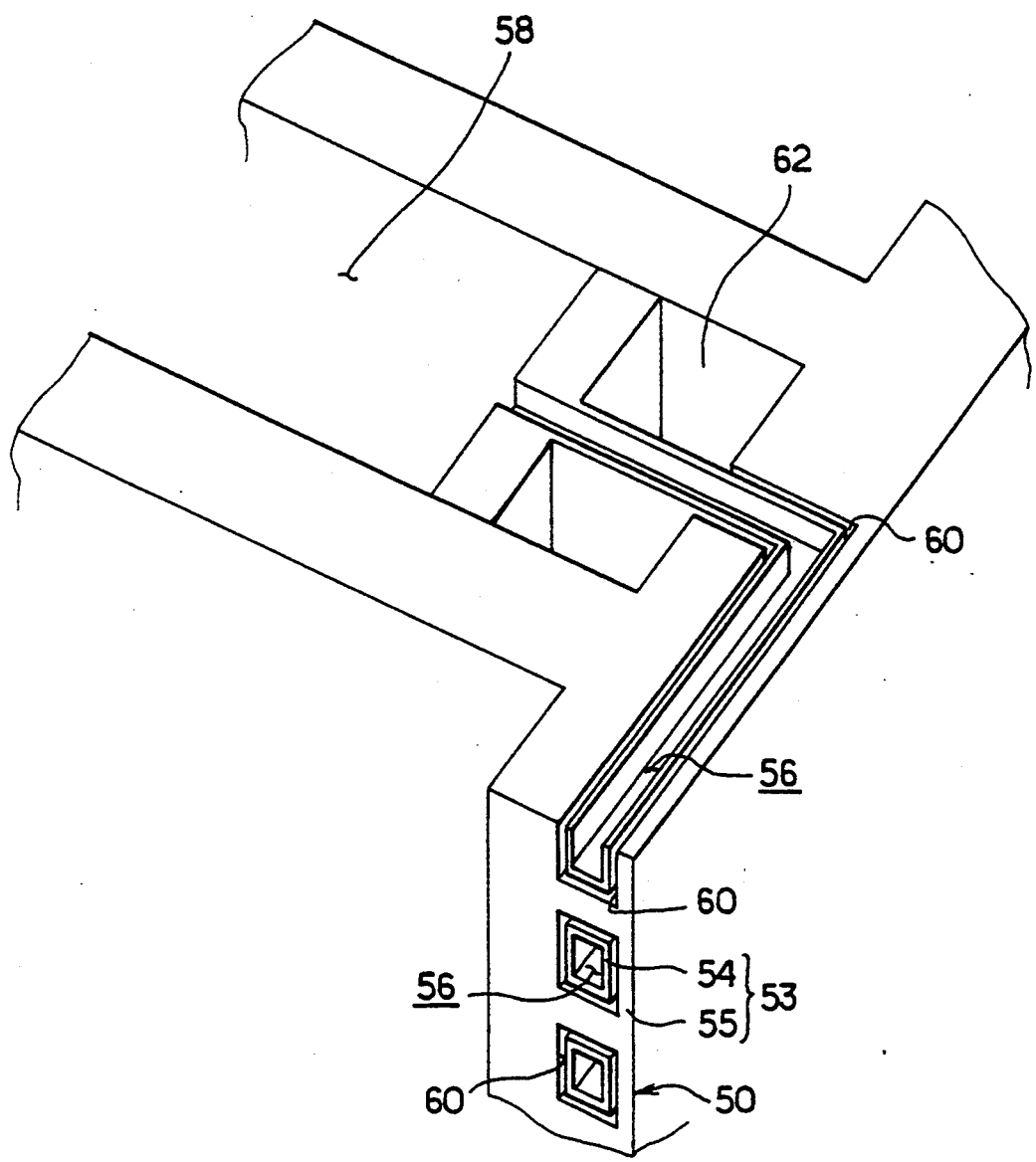
FIG. 6 is an enlarged perspective view of a portion A shown in FIG. 5.
Figure 7:
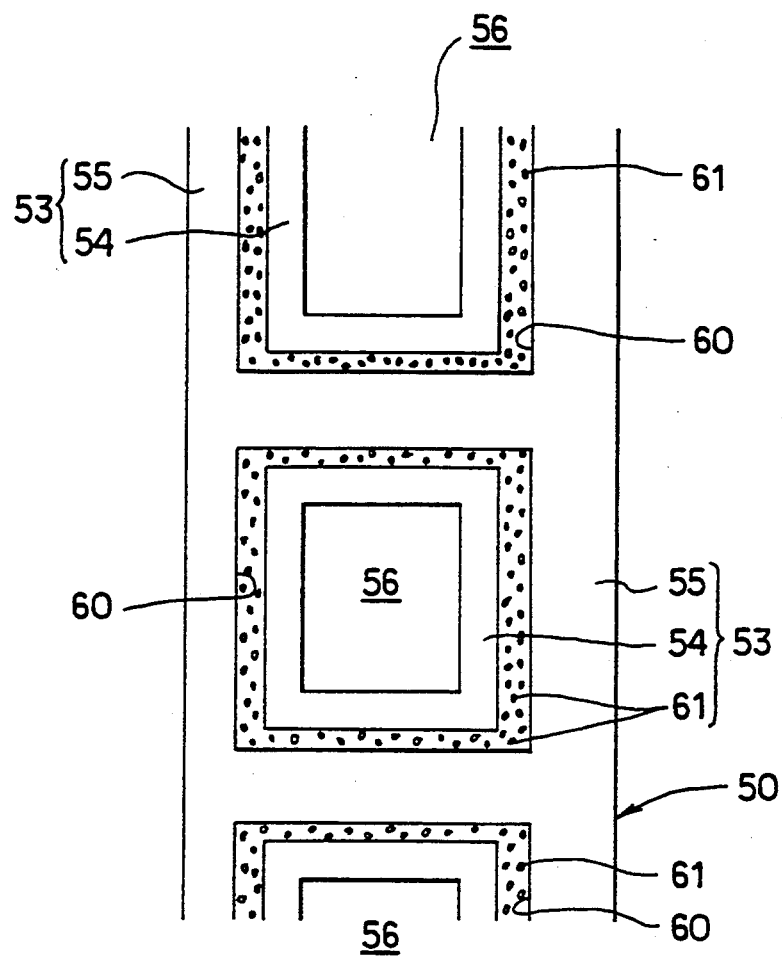
FIG. 7 is a cross-sectional view of a cooling structure formed in a first wall of each outboard blanket segment.

As shown in FIGS. 6 and 7, the cooling structure 53 of the first wall 50 is constructed by combining the inner wall members 54 and an outer wall member 55 each formed of, for example, stainless steel or ferrite steel. A cooling water channel 56 through which a cooling fluid flows is formed inside each inner wall member 54. The outer wall member 55 surrounding the inner wall members 54 may be formed of outer wall members integrally connected to each other or may be formed as one integral structural member. In this manner, a multiplicity of cooling water channels 56 are arranged parallel in the cooling structure 53 of the first wall 50.

A part or the entire of the materials forming the multi-wall of the cooling structure 53 may be formed of a hydrogen storage material or a hydrogen storage alloy. If such a material is used, the amount of tritium passing through the cooling structure 53 and entering the cooling water channels 56 can be reduced effectively and cooling water can be prevented from becoming contaminated with tritium.

One end of each cooling water channel 56 in the cooling structure 53 communicates with a supply-side first wall cooling manifold 58 formed in a back section of the blanket segment 33 of the outboard blanket assembly 22. Each cooling water channel 56 extending from the first wall cooling manifold extends through the cooling structure 53 of the first wall on the plasma 11 side to an opposite side of the blanket unit 33 to communicate with a return-side first wall cooling manifold 59 formed at this side oppositely to the supply-side first wall cooling manifold 58. The supply-return relationship between the first wall cooling manifolds 58 and 59 may be reversed.

The first wall cooling manifolds 58 and 59 extend in the longitudinal direction of the blanket segment 33 of the outboard blanket assembly 22 and are connected to the cooling water circulation piping 35 through the piping inlet/outlet port 34, as shown in FIG. 2, thereby enabling cooling water to circulate through the first wall 50 by being pumped by the cooling water circulation pump 40.

In the cooling structure 53 of the first wall 50, an annular space (gap) 60 is formed between each inner wall member 54 and the outer wall member 55 forming the structure, as shown in FIG. 7. A multiplicity of metallic wires 61 are inserted in the gap 60 to maintain good heat conduction. The metallic wires 61 may be sintered on a wall surface to improve the heat conduction. The metallic wires 61 are formed of the same material, such as SUS, as the cooling structure 53 or a material having a heat conductivity higher than that of the material of the cooling structure 53. In this connection, it will be necessary to select a material for the metallic wires 61 which causes substantially no detrimental effect on to the heat conductivity and provides suitable matching with the material of the wall structure. The inner wall member 54 and the inner surface of the outer wall member 55 are formed in rectangular shapes in sections in the present embodiment, but they may be formed so as to provide structures in the shape of pipes or other various shapes as shown, for example, in FIG. 10. In such alternative embodiment of the structure, an inner pipe structure 85 corresponds to the inner wall member 54 and an outer pipe structure 86 corresponds to the outer wall member 55. A gap 89 is formed between the inner and outer pipe structures 85 and 86 and, in the gap 89, metallic wires 90 are disposed. An inner space 88 is defined as a cooling water passage. The connection of the cooling water passage 88 and the gap 89 to manifolds or the like will be done substantially the same manner as that mentioned with reference to the embodiment shown in FIGS. 6 and 7.

Referring back to FIG. 4, the inert gas such as helium gas is caused to flow through the gaps 60 between the wall members of the cooling structure 53. As shown in FIGS. 5 and 6, one end of each gap 60 communicates with a supply-side gap flow gas manifold 62 while the other end of the gap 60 communicates with a return-side gap flow gas manifold 62. The supply-return relationship between the gap flow gas manifolds 62 may be reversed. The gap flow gas manifolds 62 are connected through the piping inlet/outlet port 34 to the gas circulation piping 36 for circulation of the inert gas such as helium to form part of the gas circulation system 39. The amount and the pressure of circulating the inert gas are regulated and controlled by the operation and control of the gas circulation pump 47 provided on the supply side of the gas circulation system 39. The operation of the gas circulation pump 47 is controlled by the controller 49.

The water content measuring device 43 provided as a mechanism for detecting a leak of cooling water as mentioned above is connected to a return path of the gas circulation piping 36 of the gas circulation system 39 to detect an increase in water content caused by a leak of cooling water due to cracking or damage of the inner wall members 54 of the cooling structure 53 of the first wall 50.

Leakage of cooling water is detected in this manner and the operation of the fusion reactor is stopped if necessary, thereby enabling the fusion reactor to be overhauled and repaired. The overhaul of the fusion reactor is as important as nuclear fuel interchange in the fission reactors such as light-water nuclear reactors. Thus, the reliability of the fusion reactor can be improved. The pressure gauge 44 provided as a pressure detection mechanism is connected in the gas circulation system 39 downstream of the water content measuring device 43. The pressure in the inter-wall gap 60 is measured with the pressure gauge. By this gap pressure measurement, it is possible to detect a leakage of the inert gas such as helium due to cracking or damage in the outer wall member 55 of the cooling structure.

If the inert gas such as helium leaks through the outer wall member 55 of the cooling structure 53 of the first wall 50, it is released to the internal space 19 of the vacuum vessel 13 shown in FIG. 1 to reduce the vacuum in the fusion reactor, which may adversely influence plasma 11.

Therefore, if leakage of the inert gas is detected, the operation of the gas circulation pump 47 is stopped by the operation of the the controller 49 shown in FIG. 3 to limit leakage of the inert gas and, if necessary, the operation of the fusion reactor is stopped to enable the reactor to be repaired or overhauled.

Further, the hydrogen processor 46 is provided in the gas circulation system 39. The hydrogen processor 46 communicates with the inter-wall gaps 60 through the gas circulation piping 36. The inert gas such as helium pumped by the circulation pump 47 to circulate through the gas circulation system 39 is introduced into the hydrogen processor 46.

Figure 4:
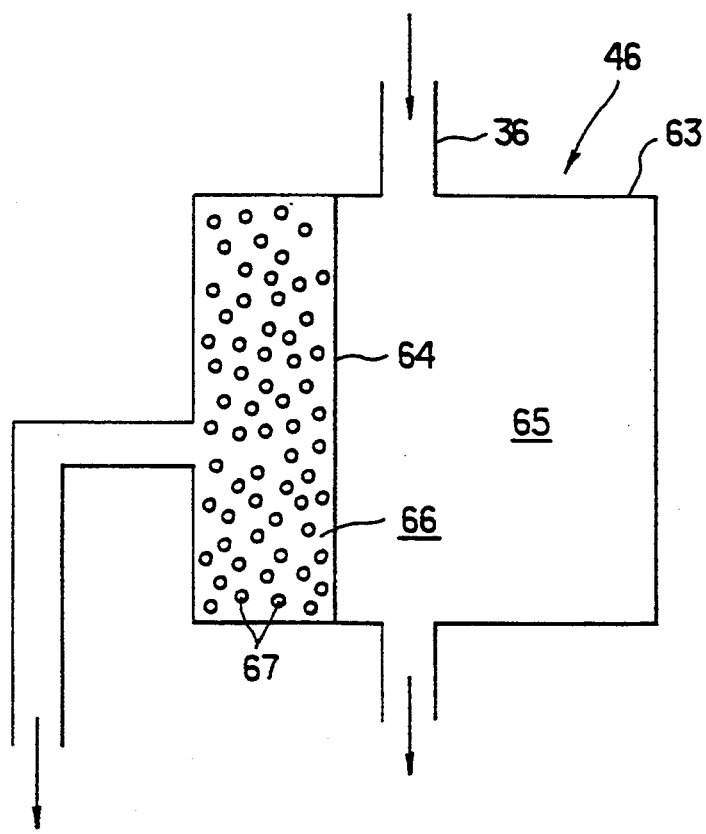
FIG. 4 is a diagram of the principle of a hydrogen processor provided in the inert gas circulation system.

The hydrogen processor 46 is a hydrogen separator, such as that shown in FIG. 4. As shown in FIG. 4, a chamber formed in a casing 63 is partitioned by a hydrogen permeable membrane 64 formed of vanadium or the like into a processed gas chamber forming a part of the gas circulation system 39 and a processing chamber 66 in which separated hydrogen and hydrogen isotopes are stored. Hydrogen included in the inert gas such as helium introduced into the processed gas chamber 65 is supplied to the processing chamber 66 through the hydrogen permeable membrane 64. Hydrogen and inert gas are thereby separated from each other. At this time, the processing chamber 66 is evacuated with the vacuum pump 48 to improve the efficiency of separation of hydrogen and hydrogen isotopes.

Hydrogen getters 67 formed of titanium or a hydrogen storage alloy are accommodated in the processing chamber 66 of the hydrogen processor 46. The separated hydrogen is adsorbed by the hydrogen getters 67. Hydrogen and hydrogen isotopes included in the inert gas are stored in the hydrogen getters 67. Examples of elements or alloy forming the hydrogen getters 67 other than titanium are Ba, Ca, Ce, Cs, Dy, Er, Gd, Hf, Ho, K, La, Li, Lu, Mg, Na, Nd, Pr, Pu, Rb, Sc, Sm, Sr, Tb, Th, Tm, U, Y, Zr, Al-Zr alloy.

By the storage of the hydrogen and hydrogen isotopes in the hydrogen getters 67, contamination of cooling water with tritium from the plasma 11 transmitting and diffusing through the cooling structure 53 and mixing in cooling water is effectively prevented.

Thus, even if the cooling structure 53 in the internal component of the fusion reactor is damaged by thermal and particle loads received from the plasma 11, the damage is detected immediately and the reliability of the fusion reactor can therefore be improved. Further, tritium (T), i.e. a hydrogen isotope radioactive material from the plasma transmitting and diffusing through the cooling structure 53 to cooling water, is collected through the gaps 60 between multiple walls of the cooling structure 53, separated by the hydrogen permeable membrane 64 and stored in the hydrogen getters 67 in the hydrogen processor 46 without being mixed in the cooling water. It is thereby possible to prevent contamination of the cooling water with tritium and to markedly improve the reactor operation safety in comparison with the prior art.

Alternatively, the hydrogen processor 46 may be arranged so as to oxidize the hydrogen and hydrogen isotopes separated by the hydrogen permeable membrane 64. In such case, hydrogen or hydrogen isotopes separated by the hydrogen permeable membrane 64 may be stored in the form of water by being recovered and burned to produce water.

The cooling structure 53 formed in the first wall 50 is manufactured in such a manner that the inner wall members 54 and the outer wall member 55 are separately formed by welding and machining and are thereafter worked by cold working such as tube expanding, hydraulic pressure forming or explosive forming so that the surfaces of the wall members are tightly fitted to each other.

Referring to FIGS. 5A and 5B, each blanket segment 33 of the outboard blanket assembly 22 also has an internal tritium breeding function. That is, in the blanket segment 33, the lithium (Li) oxide 70 is contained as a tritium breeding material and beryllium 71 is contained as a tritium breeding assistant material for multiplying neutrons. The lithium oxide 70 generates tritium (T) by utilizing neutrons scattered from the plasma 11, as expressed by a reaction formula:

$$^{6}Li + n \rightarrow {}^{4}He + T + 4.8 \text{ MeV}$$

$$^{7}Li + n \rightarrow {}^{4}He + T + n - 2.5 \text{ MeV} \qquad (1)$$

The content of $^6Li$ in naturally-existing Li is 7.92 wt %, and the content of $^7Li$ in naturally-existing Li is 92.58 wt %. Li metals and Li alloy of $Li_{17}Pb_{83}$ exist as liquid lithium. Li ceramics of $Li_2O$, $Li_2AlO_2$, $Li_2ZrO_3$, and $Li_2SiO_4$, and $Li_{62}Pb_{38}$ alloy exist as solid lithium.

To assist the generation of tritium caused by the reaction of lithium oxide and neutrons, beryllium (Be) 71 contained in each blanket segment 33 serves to multiply neutrons from the plasma 11.

$$^{9}Be + n \rightarrow 2 \times {}^{4}He + 2n \qquad (2)$$

In each blanket segment 33 of the outboard blanket assembly 22, particularly on the plasma generation side, the blanket cooling structures 73 may be arranged as multiple layers at certain intervals, as shown in FIG. 5B, in which the blanket cooling structure 73 is shown in combination of the blanket cooling structure 53. The neutron breeding material (tritium breeding assistant material), i.e., beryllium 71, and the tritium breeding material, i.e., lithium 70, are interposed between the blanket cooling structures 73.

Each blanket cooling structure 73 has a multi-wall structure having multiple walls similar to that of the structure 53 illustrated in FIG. 7 and is formed with inner wall members in which cooling water channels are formed, and an outer wall member surrounding the inner wall members. Metallic wires for heat conduction are provided in gaps between wall surfaces of the inner and outer wall members, and the inert gas such as helium is caused to flow through the gaps.

The cooling water channels formed in the inner wall members 55 of the blanket cooling structures 73 communicate with blanket cooling manifolds 75 formed in a back section of the blanket segment 33. The manifolds 75 communicate with cooling water piping 35 of cooling water circulation system 38 similar to that shown in FIG. 3 through the piping outlet/inlet port 34.

Tritium (T) is bred by the nuclear reaction of the neutrons from the plasma 11 and lithium oxide 70 in each blanket segment 33 of the outboard blanket assembly 22, and the temperature in the blanket segment 33 is increased by this nuclear reaction to a high temperature of about 400° C. The system is therefore arranged to remove heat from the interior of the blanket segment 33 by cooling with the cooling water flowing through the blanket cooling structures 73.

The cooling water is led from a cooling water circulation pump similar to that shown in FIG. 3 to the cooling water channels in the blanket cooling structures 73 through the blanket cooling manifolds 75 to cool the multi-wall blanket cooling structures 73. The fusion reactor acts to extract, as energy, the heat conducted to the coolant, i.e., cooling water through the blanket cooling structures 73. To extract the heat, a steam generator, not shown, is provided in the cooling water circulation system and steam for driving steam turbines is generated by the steam generator.

The gaps between the inner and outer wall members in the blanket cooling structures 73 are formed in the same manner as those shown in FIGS. 6 and 7, and are connected to an inert gas circulation system through gap flow gas manifolds 62 formed in a back section of each blanket segment 33.

In the gas circulation piping of the gas circulation system, a leak detection mechanism, a pressure detection mechanism and a hydrogen processor, such as those shown in FIG. 3, are provided. The inter-wall gaps communicate with the leak detection mechanism, the pressure detection mechanism and the hydrogen processor through the gas circulation piping.

Occurrence of cracking or damage in the inner and outer wall members of the blanket cooling structures 73 is detected by the leak detection mechanism, the pressure detection mechanism and the hydrogen processor, and the hydrogen and hydrogen isotopes are separated from the inert gas to be stored.

The cooling water circulation system connected to the cooling water channels in the blanket cooling structure 73 and the gas circulation system communicating with the inter-wall gaps may be arranged independently of the cooling circulation system 38 and the gas circulation system 39 provided in association with the cooling structure 53 of the first wall 50 or may be arranged as circulation systems common to the blanket cooling structures 73 and the cooling structure 53.

The blanket cooling structure is incorporated in the outboard blanket assembly and is thus connected to the cooling water circulation system and the gas circulation system in the above-described manner, and damage to the blanket cooling structure can be detected through these systems. Therefore, even if a leak of cooling water due to damage to the blanket cooling structure occurs, the progress of chemical reaction between lithium oxide and cooling water in the outboard blanket assembly can be prevented by immediately detecting the leak of cooling water. Thus, the safety and reliability with which the fusion reactor is operated can be improved.

It is to be noted that substantially the same blanket cooling structure is formed to the inboard blanket assembly 21 in the identical manner though not described in detail herein for the sake of eliminating duplicate explanation. A cooling water circulation system and a gas circulation system for the inboard blanket assembly may be independently disposed from those of the outboard one shown in FIG. 3 or commonly thereto.

Further, if this blanket cooling structure is used, tritium excessively diffused through the blanket cooling structure can be disposed of through the gaps between the walls of the inner and outer wall members of the blanket cooling structure before it reaches cooling water. It is thereby possible to prevent contamination of the cooling water and to greatly improve operation safety.

Next, in the fusion reactor, the divertors 23 are provided in upper and lower, in an installed state, positions in the toric vacuum vessel 12 of the fusion reactor.

Figure 9:
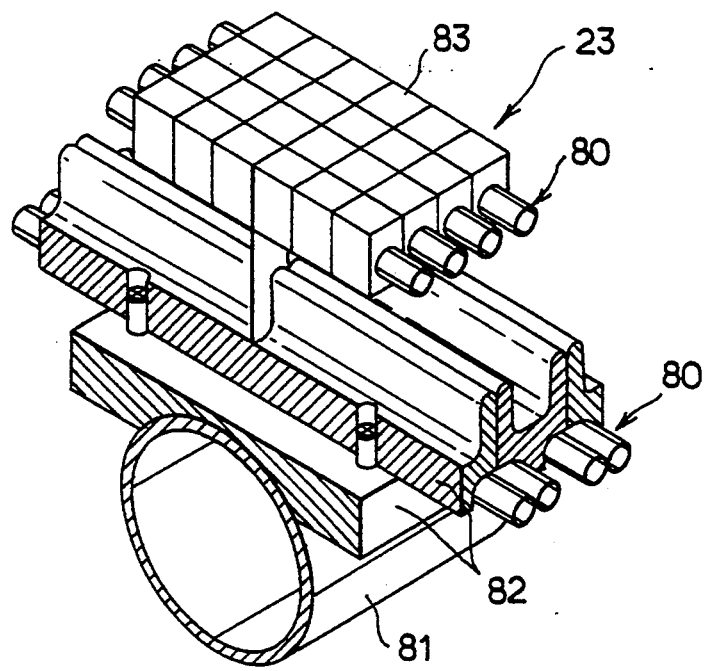
FIG. 9 is an enlarged illustration of a portion B shown in FIG. 8.
Figure 8:
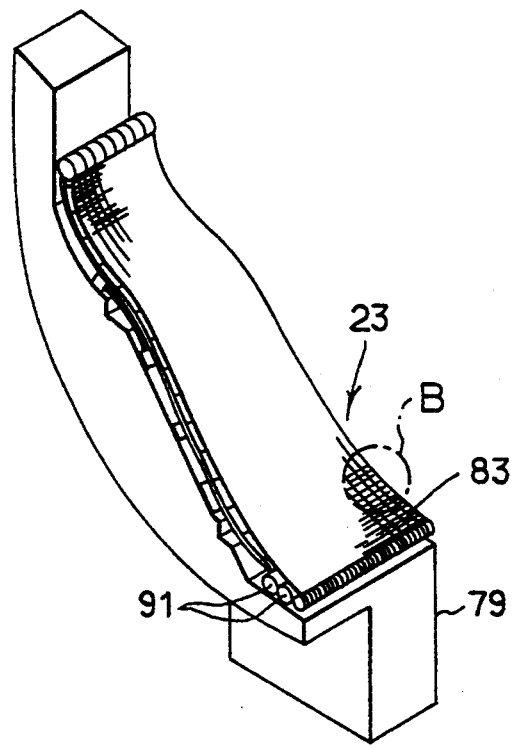
FIG. 8 is a perspective view of a divertor segment provided in the vacuum vessel of the fusion reactor.

The divertors 23 are disposed in upper and lower positions in the toric vacuum vessel 12 by being offset slightly inwardly. A plurality of, for example, 32, divertors 23 are disposed in each of the upper and lower positions along the circumferential direction of the vacuum vessel 12. As shown in FIG. 8, each divertor 23 is supported on a divertor support 79. Each divertor 23 has cooling structures 80 which are supported by divertor support pipes 81 and a support structure 82, as shown in FIG. 9.

The divertors 23 receive the greatest thermal and particle loads from the high-temperature plasma 11 among the internal component and structure of the fusion reactor and are, therefore, thermally damaged easily. The thermal load is 15 MW/mm$^2$ at the maximum, and ordinary materials are melted under such a thermal load. Therefore, heat resistant members 83 formed of a high-melting-point material, such as graphite or tungsten, are attached to the plasma-side surfaces of the divertors 23 by means of brazing or the like.

Figure 10:
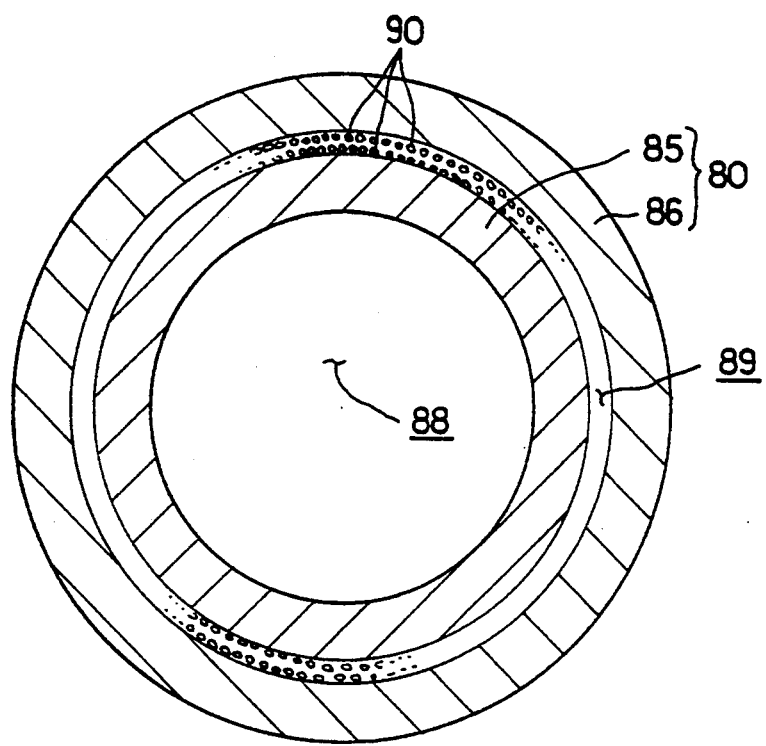
FIG. 10 is a cross-sectional view of a cooling structure provided in the divertor.

A pipe structure, such as that shown in FIG. 10, formed of Cu or the like having a high heat conductivity is adopted as the cooling structure 80 of each divertor 23. That is, each cooling structure 80 is formed as a structure in which an inner pipe 85 forms an inner wall and an outer pipe 86 forms an outer wall surrounding the inner pipe. If each cooling structure 80 is formed as such a structure, the heat conductivity is reduced. However, the thickness of outer pipes 86 closer to the plasma may reduced to improve the heat conductivity. Of course, it is to be noted that the structure such as shown in FIG. 7 may be adopted in place of the circular pipe structure of FIG. 10 for the divertor 23.

Ordinarily, the strength of copper (Cu) is reduced at high temperatures. Copper used for cooling the divertors 23 is heated to about 800° C. as a maximum, and the strength of copper is considerably reduced at such a temperature. Therefore, a high-temperature resistant strength material called alumina-diffused strengthened copper may be used instead of copper to increase the strength of the cooling structures 80. In this case, however, there is a risk of occurrence of cracking in the high-melting-point heat resistant members 83 covering the cooling structures 80 due to thermal stress. To prevent occurrence of damage including this cracking, the cooling structures 80 closer to the heat resistant members 83 may be constructed in such a manner that ordinary copper is used as a stress buffer having a high heat conductivity to form the outer pipes 86 while alumina-diffused strengthened copper is used to form the inner pipes 85. In this manner, the cooling structures 80 having improved reliability while maintaining desired physical and mechanical strength can be formed.

As shown in FIG. 10, each cooling structure 80 of the divertors 23 forms a structure, a cooling water channel 88 through which the cooling water is caused to flow is formed in the inner pipe 85 forming an inner surface, an annular gap 89 is formed between the inner pipe 85 and an outer wall formed by the outer pipe 86, and metallic wires 90 having high heat conductivity are placed in the gap 89. The inert gas such as helium is led through the gap 89.

Figure 11:
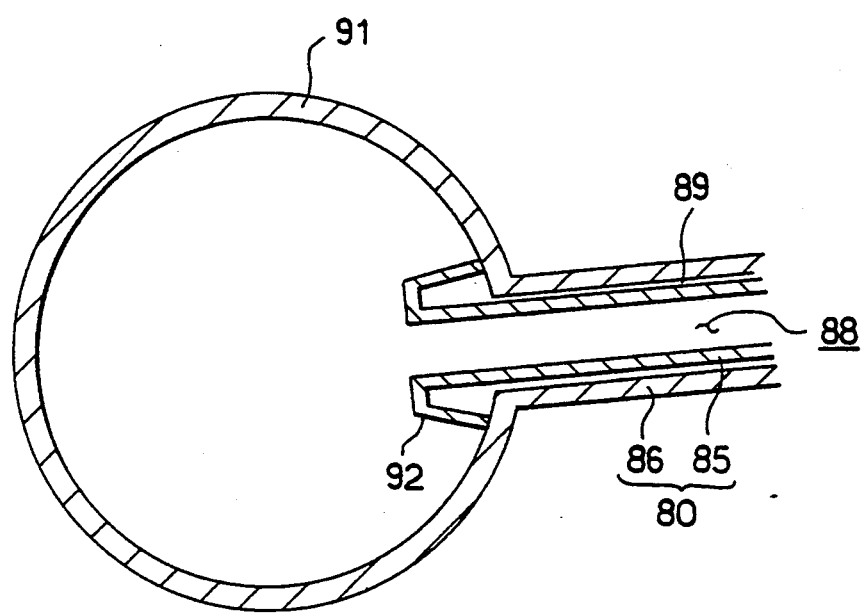
FIG. 11 is a cross-sectional view of a connection between the divertor cooling structure and a manifold.

As shown in FIG. 11, the cooling water channel 83 in each cooling structure 80 is connected to divertor cooling manifolds 91, while the inter-wall gap 89 communicates with gap flow gas manifolds 92. The gap flow gas manifolds 92 are formed, for example, in the divertor cooling manifolds 91. There divertor cooling manifolds 91 are arranged independently with respect to the cooling water supply/return sides. The sectional shape of the manifolds 91 and 92 may be selected from various shapes.

The divertor cooling manifolds 91, for example, circular in section, are connected to a cooling water circulation system similar to that shown in FIG. 3, and cooling water is pumped up by an the circulation pump to circulate through the divertor cooling manifolds 91 and the cooling water channels 88 in the cooling structures 80.

The inter-wall gaps 84 in the cooling structures 80 are connected to a gas circulation system similar to that shown in FIG. 3 through the gap flow manifolds 92, and the inert gas such as helium is pumped by a non-illustrated pump to circulate through the gaps 84. A leak detection mechanism, a pressure detection mechanism and a hydrogen processor are provided in the gas circulation system. Cracking or damage in the inner and outer pipes of the cooling structures 80 is detected by the leak detection mechanism or the pressure detection mechanism, and the hydrogen and hydrogen isotopes are separated and stored by the hydrogen processor.

The reliability of the divertors 23 used under severer conditions in comparison with the first wall 50 of the outboard blanket assembly 22 can be improved by forming the cooling structures 80 of the divertors 23 in a two-wall structure and by covering the high-temperature plasma side with heat resistant material 83 formed of a high-melting-point material.

The cooling structure 80 of the circular piping arrangement may be changed with that shown in FIG. 3 in an alternative arrangement. That is, the respective cooling structures 53, 73 and 80 may be of substantially the same form to provide, for example, a rectangular or circular cross section.

In a case where helium or inert gas leaks to the internal space 19 of the vacuum vessel 12 resulting from a damage to the cooling structures 53, 73 and 80 of the internal structure assembly 18 disposed in the toric vacuum vessel 12 of the fusion reactor along the circumferential direction thereof, the helium detector 31 or the gas detection means detects the helium leak, and it is possible to find the fact that some of the cooling structures 53, 73 and 80 are damaged by this detection. In such a case, if a plurality of helium detectors 31 are provided, it is possible to determine a portion of the vacuum vessel where the helium leakage is largest and to thereby ascertain the damaged portion of the cooling structures.

To definitely discriminate helium generated by fusion reaction and a helium leakage due to damage to the cooling structures 53, 73 and 80, the arrangement may be such that the inert gas other than helium or a mixture gas of such inert gas is used as a gas flowing in the cooling structures 53, 73, and 80 and the detector 31 detects gases other than helium. Further, if the inert gas concentration is occasionally varied with respect to the gas flow channels of the cooling structures 53, 73 and 80, a damaged portion of the cooling structure can be determined more definitely.

Thus, a damaged portion of the cooling structures 53, 73 and 80 can be ascertained by the plurality of helium detectors 31 communicating with the internal space 19 of the toric vacuum vessel 12 and can therefore be repaired promptly. Thus, it is possible to provide a fusion reactor having further improved reliability.

Figure 12:
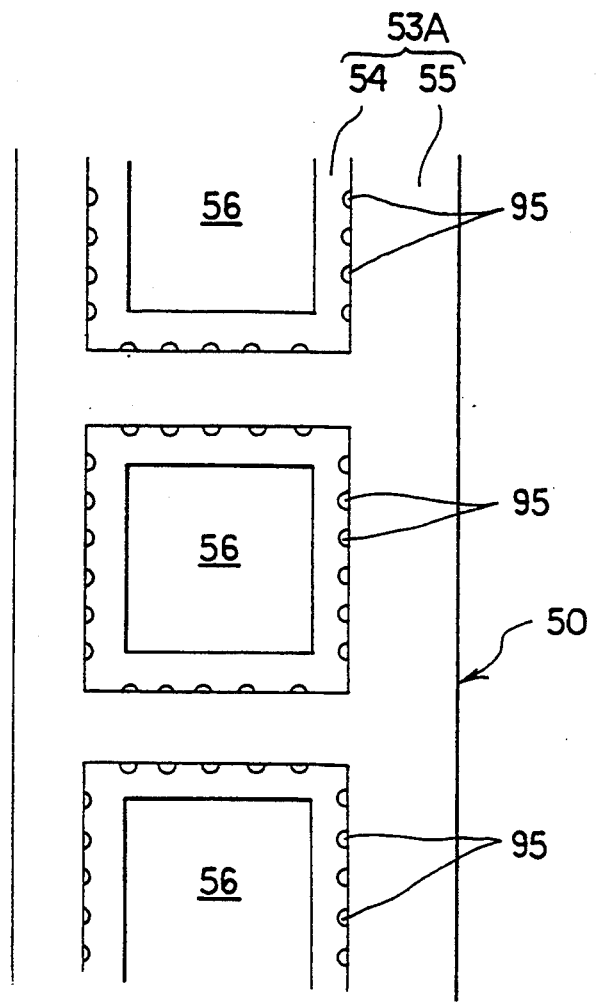
FIG. 12 is a cross-sectional view of an example of a modification of the cooling structure provided in each outboard blanket segment.

In the embodiment of the present invention described above, annular inter-wall gaps 60 are formed in the cooling structure 53 of the first wall formed in the outboard blanket assembly 22 and metallic wires 61 are placed in the gaps 60. Alternatively, the arrangement may be such that, as shown in FIG. 12, the multiple wall surfaces of cooling structure 53A formed of inner wall members 54 and an outer wall member 55 are closely fitted to each other, gas flow grooves 95 are formed as partial gaps between the wall members, and inert gas such as helium is caused to flow through the flow grooves 95. Since the wall surfaces of the cooling structure 53A are maintained in close contact with each other, the inter-wall heat conduction area is large and the heat conduction between the walls is improved. It is thereby possible to efficiently remove heat from the components. In this arrangement, however, the inner-wall gaps through which inert gas such as helium flows may restricted and the rate at which the gas flows through the flow grooves 95 is therefore reduced, resulting in an increase in the time taken to detect leakage of cooling water.

In the internal components of this fusion reactor, the wall surfaces are tightly fitted to each other with gas flow grooves formed therebetween or wires for heat conductions are provided in gaps between the wall surfaces not close to each other, the gas such as helium is caused to flow through the grooves or gaps, and a leak detection mechanism and a pressure detection mechanism communicating with the gaps are provided, thereby enabling cracking and damage in the cooling structures to be detected even from a stage where the amount of cracking or damage is very small. In addition, a hydrogen processor is provided to dispose of hydrogen or hydrogen isotopes before they enter the cooling channels. It is thereby possible to provide a fusion reactor capable of being operated more safely and reliably in comparison with a fusion reactor of the prior art.

Figure 13:
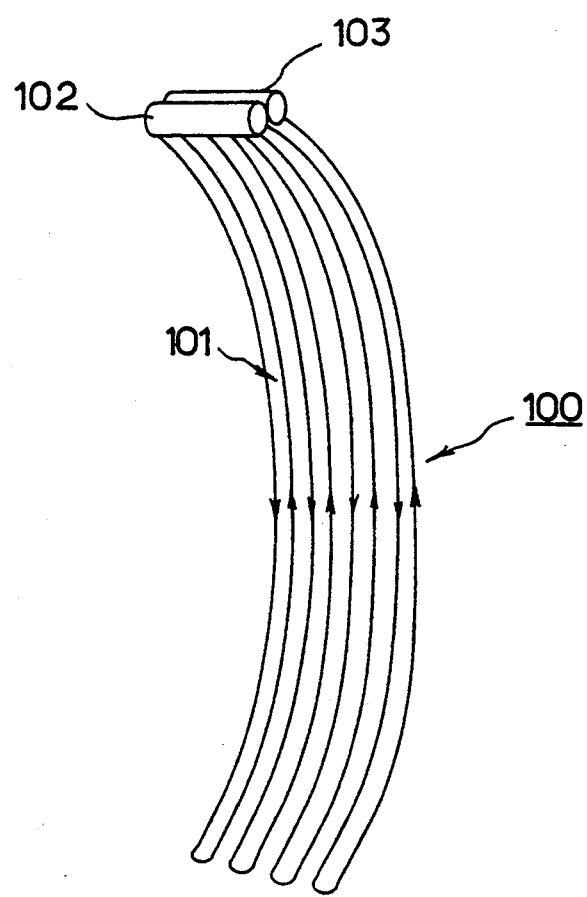
FIG. 13 is a brief illustration of a perspective view of a wall structure provided with a cooling structure which is applied to an interior structure assembly for the internal component of a fusion reactor.

FIG. 13 shows an illustration of a brief structure of a modified cooling structure for the inboard or outboard blanket assembly, or divertor structure of the former embodiment.

In the former embodiment, the cooling structure 53, 73 or 80 is mentioned, in which the cooling structure is formed integrally with the first wall structure of the blanket or divertor. However, the first wall surface 50 faces the plasma 11, so that the surface 50 liable to be subjected to the damage due to the thermal load from the plasma 11. It is therefore necessary to exchange the wall structure several times during the life time of the fusion reactor. The exchanging thereof, however, requires the exchanging of the blanket assembly together for the former embodiment in which the wall structure is integrated with the blanket assembly, which is large in size and heavy in weight such as of about 40–80 tons, thus being inconvenient and troublesome. Furthermore, such exchanging working has to be usually performed in consideration of radiation exposure to workers, thus further providing a severe problem.

In view of the above matter, the present invention provides another embodiment of the fusion reactor internal component provided with a cooling structure, in which the cooling structure is separately formed from the blanket or divertor assembly.

Referring to FIG. 13, a separate-type wall structure 100 corresponding to the wall surface 50 in the first embodiment. The wall structure 100 has a shape corresponding to the outer surface of a blanket assembly, not shown in FIG. 13 but is identical to that of FIG. 2, to which this wall structure is applied, and is provided with a cooling structure 101. As shown by arrows, the cooling water flows in a flow passage of the cooling structure from an inlet manifold 102 and out from an outlet manifold 103.

Figure 14:
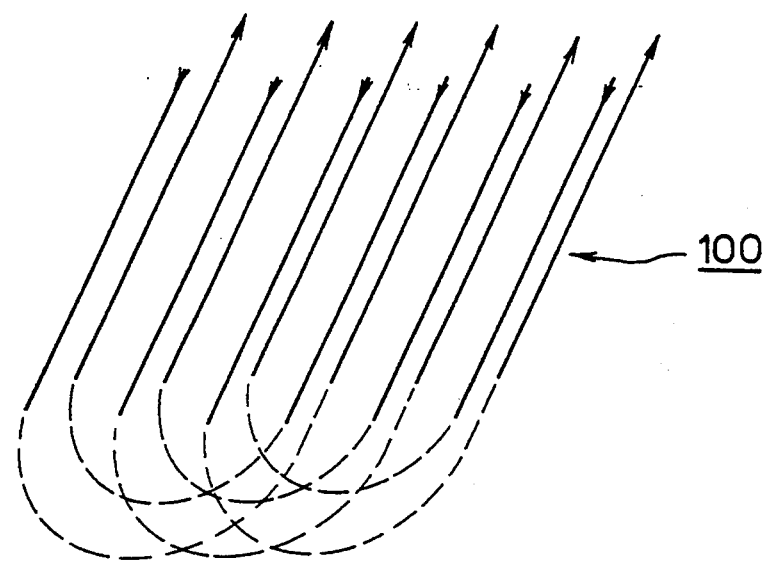
FIG. 14 is an illustration showing a flow mode of a cooling water in the cooling structure of FIG. 13.

In the illustration of FIG. 13, the cooling water turns at the lower end of the flow passage to the flow passage directly adjacent to the aforementioned flow passage, but in practical use, it is desired that the flow of the cooling water is done as shown in FIG. 14, in which the cooling water flows from one flow passage to another passage apart from the first passage by two or three numbers thereof because of the actual design of the cooling structure at the turning position at which it is difficult to sharply turn the flow passage.

Figure 15:
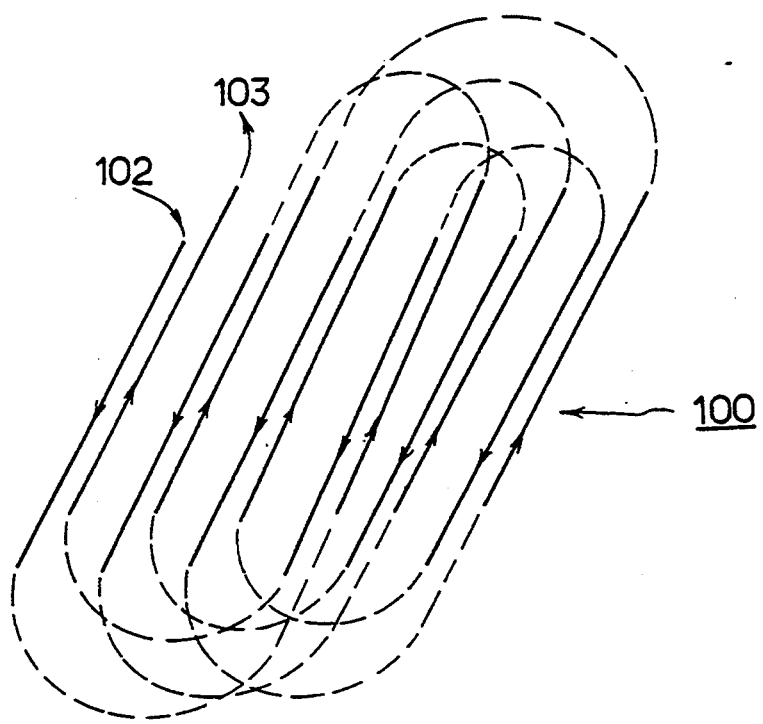
FIG. 15 is also an illustration showing a modified flow mode of the cooling water in the cooling structure.
Figure 16:
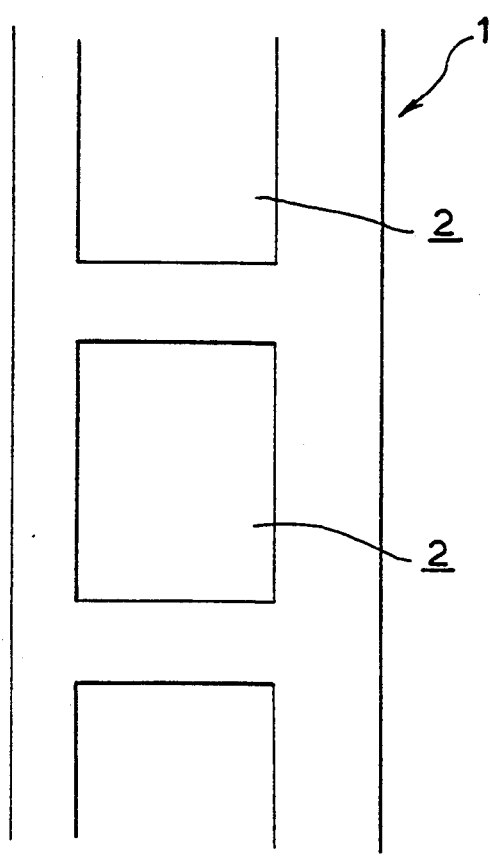
FIG. 16 is a cross-sectional view of a cooling structure provided in a conventional blanket of a fusion reactor, for example.

This flow circulation mode may be changed to another mode such as that shown in FIG. 15, and it will of course be understood that a further flow circulation mode may be adapted.

Furthermore, the wall structure 100 provided with the cooling structure 101 may be applied to the inboard blanket assembly and the divertor member as well as the outboard blanket assembly without using no specific means. The application of such wall structure 100 to the surface of the outboard blanket assembly facing the plasma will be done by suitable means such as welding or by using a jig. Still furthermore, in a further modified embodiment, the wall structure 100 may be divided into a plurality of vertical, in an illustrated state, sections for the purpose of easy manufacturing and handling thereof.

It is also to be noted that the present invention is not limited to the described embodiments and many other changes and modifications may be made without departing from the scopes of the appended claims.

As described above, in the internal components or structures of the fusion reactor in accordance with the present invention, the cooling structures are formed in the internal structure assembly provided in the toric vacuum vessel and cooling fluid channels are formed in the cooling structures, thereby achieving multiple protection against thermal and particle loads received from the plasma by the cooling structures. To improve heat conduction between the walls in the cooling structures, the walls are closely fitted to each other or metallic wires are provided in the gaps formed between the multiple walls, and the thickness of the walls is changed for a further improvement in heat conduction, thereby achieving multiple protection without impairing the internal component cooling function. In the cooling structures, flow grooves through which a fluid flows are formed as partial gaps between closely-fitted surfaces of the walls, and a function of detecting a leak of the coolant through the flow grooves or gaps between the multiple walls is provided, thereby making it possible to detect even a small coolant leak due to cracking or damage in the cooling structures. It is therefore possible to prevent rupture or damage in the cooling structures with the advancement of damage or cracking in the internal structure of the fusion reactor or a loss-of-coolant accident due to a rapture or damage in the cooling structures.

If the kind and the mixture ratio of fluids flowing through the gaps formed between the walls of the cooling structures or through flow grooves formed as partial gaps are suitably selected, the place in the cooling structures where cracking or damage occurs can be ascertained. It is thereby possible to rapidly take the appropriate measures for repair and maintenance of the internal components or structures of the fusion reactor. The reliability of the fusion reactor is thereby improved.

Further, the function of disposing of tritium passing through the cooling structures through the gaps formed between the walls of the cooling structures or through flow grooves forming partial gaps is provided, and hydrogen storage alloy is used to form a part of or the entire material of the walls. The amount of the tritium passing and diffusing through the cooling structures and entering the coolant can be thereby reduced effectively, thereby limiting a tritium contamination of the coolant.

Obviously, numerous modifications and variations of the present invention are possible in light of the above teachings. It is therefore to be understood that within the scope of the appended claims, the invention may be practiced otherwise than as specifically described herein.

What is claimed is:

1. An internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space device in the internal structure assembly, said internal component comprising:

a cooling structure formed in the internal structure assembly, said cooling structure including an inner wall member in which a flow channel for the cooling fluid is formed and an outer wall member surrounding said inner wall member with a gap formed therebetween wherein said flow channel formed in said cooling structure for the cooling fluid extracts heat caused by the plasma and a nuclear reaction; and a leak detection mechanism which communicates with the gap and detects leakage of the cooling fluid into said gap between the inner and outer wall members.

2. An internal component of a fusion reactor according to claim 1, which comprises a hydrogen processor wherein a gap is formed between the walls and said hydrogen processor so as to separate and store hydrogen and hydrogen isotopes entering said cooling structure.

3. An internal component of a fusion reactor according to claim 2, which comprises a gas circulation system in which a gas circulates and for which said hydrogen processor is provided, wherein an internal space of said hydrogen processor is partitioned into a processed gas chamber forming a part of the gas circulation system and a processing chamber storing hydrogen and hydrogen isotopes by a hydrogen permeable membrane permeable to hydrogen and hydrogen isotopes.

4. An internal component of a fusion reactor according to claim 3, wherein said hydrogen processor oxidizes at least one of hydrogen and hydrogen isotopes separated by the hydrogen permeable membrane.

5. An internal apparatus of a fusion reactor according to claim 3, which comprises a hydrogen getter which is located in the processing chamber of said hydrogen processor wherein separated hydrogen and hydrogen isotopes are absorbed and stored by the hydrogen getter.

6. An internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly, said internal component comprising:

a cooling structure having inner and outer walls formed in the internal structure assembly;

a flow channel formed in said cooling structure for cooling fluid for extracting heat caused by the plasma and a nuclear reaction, and gas and liquid circulating systems;

wherein a gap is formed between the walls of the cooling structure and the gas and liquid circulation systems are communicated with the gap, said circulation systems including a mechanism which measures a change of a state of pressure and water content in a gas and a liquid existing in said gap so as to detect a leak of the gas and a cooling liquid flowing through the cooling structure.

7. An internal component of a fusion reactor according to claim 6, wherein the change of the state includes the temperature in the gas to detect a leak of the gas.

8. An internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly, said internal component comprising:

a cooling structure having inner and outer walls formed in the internal structure assembly;

a flow channel formed in said cooling structure for a cooling fluid for extracting heat caused by the plasma and a nuclear reaction, and a pressure detecting mechanism wherein a gap is formed between the walls of the cooling structure and the pressure detection mechanism communicates with the gap so as to detect a leak of the cooling structure of a gas existing in said gap.

9. An internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly, said internal component comprising:

a cooling structure having inner and outer walls formed in the internal structure assembly; and a flow channel formed in said cooling structure for a cooling fluid which extracts heat caused by the plasma and a nuclear reaction, wherein a detector for detecting a gas is provided at an exhaust port communicating with the internal space of the toric vacuum vessel so as to detect a leak of the gas out of the cooling structure through an internal space of the vacuum vessel.

10. An internal component of a fusion reactor in which an internal structure assembly is housed in a toric vacuum vessel in an arrangement along a circumferential direction thereof and in which a high-temperature plasma in which hydrogen and hydrogen isotopes are maintained in a plasma state is confined in a toric internal space defined in the internal structure assembly, said internal component comprising:

a cooling structure having inner and outer walls formed in the internal structure assembly; and a flow channel formed in said cooling structure for a cooling fluid for extracting heat caused by the plasma and a nuclear reaction, wherein a plurality of exhaust ports communicating with the internal space of the toric vacuum vessel are arranged in a circumferential direction of the vacuum vessel and detectors for detecting a gas are respectively provided at the exhaust ports to detect a place through which the gas leaks out of the cooling structure.

11. An internal component of a fusion reactor according to claim 1, wherein a gap is formed between the multiple walls of the cooling structure and metallic wires having a high heat conductivity are provided in the gap.

12. An internal component of a fusion reactor according to claim 11, wherein said metallic wires are formed of the same material as that of the cooling structure.

13. An internal component of a fusion reactor according to claim 11, wherein said metallic wires are formed of a material having a heat conductivity higher than that of a material forming the cooling structure.

14. An internal component of a fusion reactor according to claim 1, wherein said walls are closely fitted to each other with partial gaps formed between the walls as grooves through which a fluid is caused to flow.

15. An internal component of a fusion reactor according to claim 1, wherein said structure has at least a portion formed of one of a hydrogen storage material and an alloy thereof.

16. An internal component of a fusion reactor according to claim 1, wherein said structure has a thickness which is reduced at a side facing the high-temperature plasma.

17. An internal component of a fusion reactor according to claim 1, wherein said internal structure assembly comprises a plurality of outboard blanket assemblies each having a surface facing the plasma, a plurality of inboard blanket assemblies each having a surface facing the plasma and a plurality of diverter assemblies each having a surface facing the plasma, said outboard blanket assemblies and said inboard blanket assemblies and said diverter assemblies being arranged along a circumferential direction of the toric vacuum vessel and wherein each of said outboard blanket assemblies and said inboard blanket assemblies and said diverter assemblies is provided with the cooling structure formed on the surface thereof facing the plasma.

18. An internal component of a fusion reactor according to claim 17, wherein a gap is formed between the walls and a hydrogen processor capable of communicating with the gap is provided to separate and store hydrogen and hydrogen isotopes entering said cooling structure.

19. An internal component of a fusion reactor according to claim 18, wherein said hydrogen processor is provided for a gas circulation system in which a gas circulates, an internal space of said hydrogen processor is partitioned into a processed gas chamber forming a part of the gas circulation system and a processing chamber for storing hydrogen and hydrogen isotopes by a hydrogen permeable membrane which is permeable to hydrogen and hydrogen isotopes.

20. An internal component of a fusion reactor according to claim 19, wherein said hydrogen processor oxidizes at least one of hydrogen and hydrogen isotopes separated by the hydrogen permeable membrane.

21. An internal apparatus of a fusion reactor according to claim 19, which comprises a hydrogen getter accommodated in the processing chamber of said hydrogen processor wherein separated hydrogen and hydrogen isotopes are absorbed and stored by the hydrogen getter.

22. An internal apparatus of a fusion reactor according to claim 17, wherein a gap is formed between the walls and gas and liquid circulation systems are communicated with the gap, said circulation systems including a mechanism which measures a change of a state of pressure and water content in a gas and a liquid existing in said gap to detect a leak of the gas and a cooling liquid flowing through the cooling structure.

23. An internal component of a fusion reactor according to claim 17, wherein a gap is formed between the walls of the cooling structure and a pressure detection mechanism, which communicates with the gap, is provided to detect a leak out of the cooling structure of a gas existing in the gap.

24. An internal component of a fusion reactor according to claim 17, wherein a detector for detecting a gas is provided at an exhaust port communicating with the internal space of the toric vacuum vessel to detect a leak of the gas out of said cooling structure through an internal space of the vacuum vessel.

25. An internal component of a fusion reactor according to claim 17, wherein a plurality of exhaust ports communicating with the internal space of the toric vacuum vessel are arranged in a circumferential direction of the vacuum vessel and detectors for detecting a gas are respectively provided at said exhaust ports to detect a place through which the gas leaks out of the cooling structure.

26. An internal component of a fusion reactor according to claim 17, wherein a gap is formed between the walls of said cooling structure and wherein metallic wires having a high heat conductivity are provided in said gap.

27. An internal component of a fusion reactor according to claim 26, wherein said metallic wires are formed of a same material as that of the cooling structure.

28. An internal component of a fusion reactor according to claim 26, wherein said metallic wires are formed of a material having a heat conductivity higher than that of a material forming the cooling structure.

29. An internal component of a fusion reactor according to claim 17, wherein said walls are closely fitted to each other with partial gaps formed between the walls so as to form grooves through which a fluid is caused to flow.

30. An internal component of a fusion reactor according to claim 18, wherein said structure has at least a portion formed of one of a hydrogen storage material and an alloy thereof.

31. An internal component of a fusion reactor according to claim 17, wherein said structure has a thickness which is reduced at a side facing the high-temperature plasma.

32. An internal component of a fusion reactor according to claim 17, wherein said structure has a rectangular shape in cross section.

33. An internal component of a fusion reactor according to claim 17, wherein said structure has a circular shape in cross section.

34. An internal component of a fusion reactor according to claim 17, wherein the circular structure comprises inner and outer pipe members between which a circular gap is formed.

35. An internal component of a fusion reactor according to claim 17, wherein the cooling structure is integrally formed with the surface, facing the plasma, of each of the outboard blanket assemblies, inboard blanket assemblies and diverter assemblies.

36. An internal component of a fusion reactor according to claim 17, wherein the cooling structure is separately formed from the surface, facing the plasma, of each of the outboard blanket assemblies, inboard blanket assemblies and diverter assemblies and the cooling structure is secured to the surface thereof.

* * * * *